(12) United States Patent
Titus

(10) Patent No.: US 12,264,090 B2
(45) Date of Patent: Apr. 1, 2025

(54) WASTEWATER AERATOR/DIGESTERS

(71) Applicant: Titus Wastewater Solutions Inc., Casper, WY (US)

(72) Inventor: Lewis Titus, Prineville, OR (US)

(73) Assignee: TITUS WASTEWATER SOLUTIONS INC., Casper, WY (US)

( * ) Notice: Subject to any disclaimer, the term of this patent is extended or adjusted under 35 U.S.C. 154(b) by 915 days.

(21) Appl. No.: 17/444,100

(22) Filed: Jul. 30, 2021

(65) Prior Publication Data
US 2023/0029790 A1    Feb. 2, 2023

(51) Int. Cl.
| B01F 23/231 | (2022.01) |
| B01F 23/237 | (2022.01) |
| C02F 3/20 | (2023.01) |
| B01F 101/00 | (2022.01) |

(52) U.S. Cl.
CPC ........ *C02F 3/201* (2013.01); *B01F 23/23123* (2022.01); *B01F 23/23124* (2022.01); *B01F 23/231231* (2022.01); *B01F 23/231232* (2022.01); *B01F 23/23125* (2022.01); *B01F 23/231265* (2022.01); *B01F 23/23128* (2022.01); *B01F 23/237611* (2022.01); *B01F 23/237613* (2022.01); *B01F 2101/305* (2022.01); *B01F 2215/0431* (2013.01); *B01F 2215/0486* (2013.01)

(58) Field of Classification Search
CPC ........ B01F 23/23124; B01F 23/231231; B01F 23/231232; B01F 23/231265; C02F 3/201
See application file for complete search history.

(56) References Cited

U.S. PATENT DOCUMENTS

| 3,193,260 A | | 7/1965 | Lamb |
| 4,070,423 A | | 1/1978 | Pierce |
| 4,489,016 A | * | 12/1984 | Kriebel ............ B01F 23/23124 |
| | | | 422/231 |
| 5,560,875 A | * | 10/1996 | Meshengisser ... B01F 23/23123 |
| | | | 261/122.1 |

(Continued)

FOREIGN PATENT DOCUMENTS

| JP | 10229781 A | 9/1998 |
| JP | 2007000777 A | 1/2007 |

OTHER PUBLICATIONS

U.S. Appl. No. 17/159,721, Non-Final Office Action dated Jul. 11, 2022, 23 pages.

(Continued)

*Primary Examiner* — Bradley R Spies
(74) *Attorney, Agent, or Firm* — Leber IP LAW; Shelly M. Fujikawa

(57) ABSTRACT

A mixing aerator is disclosed that includes a housing defining a chamber having a bottom end and a top end, the housing having at least one inlet and at least one outlet; and a longitudinally extending diffuser disposed within the chamber and configured to deliver air bubbles into the chamber when the chamber is filled with liquid. The diffuser includes (a) a tubular elastomeric membrane having a plurality of perforations and, within the tubular elastomeric membrane, (b) an air pipe having a plurality of openings, the openings being larger and fewer than the perforations, and the tubular membrane having upper and lower ends that are sealed against an outer surface of the air pipe.

16 Claims, 8 Drawing Sheets

(56) References Cited

U.S. PATENT DOCUMENTS

| | | |
|---|---|---|
| 7,874,548 B1 | 1/2011 | McGuffin |
| 7,963,508 B1 | 6/2011 | McGuffin |
| 9,533,900 B2 | 1/2017 | Stark |
| 9,539,550 B1 | 1/2017 | Frankel et al. |
| 2005/0151281 A1* | 7/2005 | Tharp ............. B01F 23/231242 |
| | | 261/122.1 |
| 2010/0288683 A1 | 11/2010 | Coomer et al. |
| 2014/0374928 A1 | 12/2014 | Frankel et al. |

OTHER PUBLICATIONS

U.S. Appl. No. 17/159,721, Final Office Action dated Nov. 8, 2022, 23 pages.

* cited by examiner

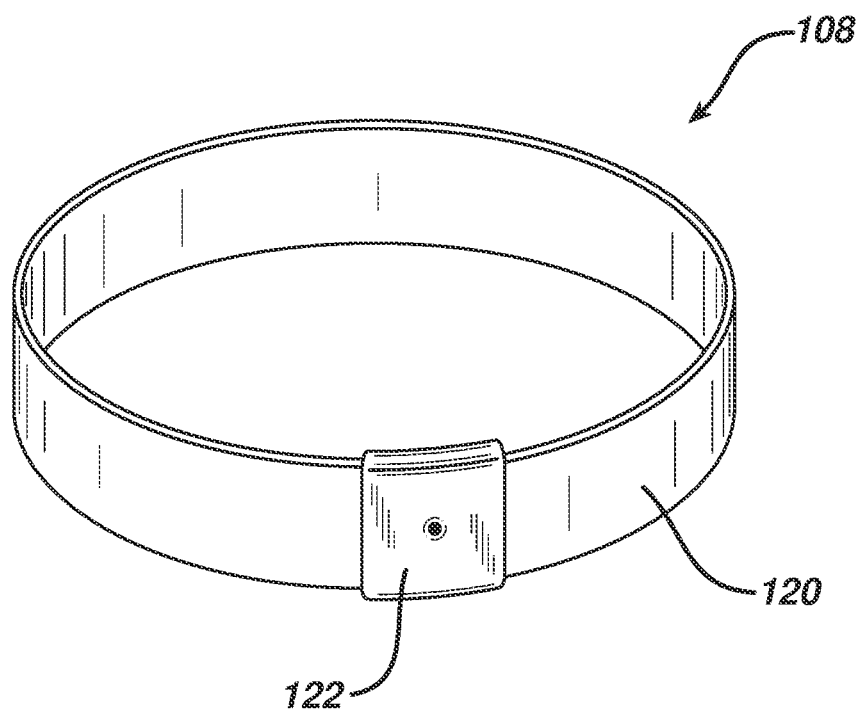

WASTEWATER AERATOR/DIGESTERS

TECHNICAL FIELD

The present application relates generally to aerator/digesters for use in wastewater treatment facilities, in particular for eliminating the buildup of fats, oils, greases, and other undesirable materials found in pump lift stations, wet wells and grease interceptors.

BACKGROUND

Pump lift stations are easily fouled with grease, fats, and oils from sewer lines. The problem of grease fouling is exacerbated by clogging from debris such as mopheads (formed from wipes), rags and sanitary products. Because these fouling agents are continually present in sewer water fouling occurs continuously and unblocking needs to be performed frequently, incurring significant labor and costs. In addition, pump lift stations typically have odor issues, which it would be desirable to address with chemical-free odor control techniques, such as delivery of gaseous ozone, which also enhances breakdown of fatty acids in grease, fats, and oils.

A system that has been used to address these problems is disclosed in U.S. Pat. No. 9,533,900 ("the '900 patent"), the full disclosure of which is incorporated by reference herein. A mixing aerator embodying the technology described in the '900 patent is sold commercially under the tradename TITUS TWISTER Mixing Aerators.

Referring to FIG. 1, an aerator/digestor of the type disclosed in the '900 patent is indicated generally by numeral 10. As discussed in the '900 patent, aerator/digestor 10 includes a tubular housing 12 having an upper end 14 and a lower end 16, formed, for example, of stainless steel or other corrosion-resistant material.

Fitted into the upper end 14 of the tubular housing 12 is a plug 18 having an aperture 20 formed through its thickness dimension and located at the center thereof. Affixed to the underside of the plug 18 is a stationary, triangular impingement member 34. Located above the lower end 16 of the housing 12 is an internal seal plate 22 beneath which is a ballast member 24. The ballast member may be concrete or other heavy material such as stainless steel with concrete being preferred due to its low cost. An external bottom cap 26 fits over the bottom end of the housing to serve as a base.

The seal plate 22 and the ballast member 24 have a centrally disposed vertical bore 28 which may be threaded or unthreaded.

Located just below the top plug 18 are three inverted U-shaped openings, equally spaced about the perimeter of the housing, only one of which is visible in FIG. 2 and is identified by numeral 30. The three U-shaped apertures function as discharge openings.

Located just above the seal plate 22 proximate the bottom end of the housing 12 are three equally spaced apart circular apertures in the housing wall, only one of which is visible in FIG. 1 and is identified by numeral 32. The apertures 32 function as waste stream entrance ports.

Extending through the cap 14, the bore 20 and the plug 18, and the bore 36 in the impingement member, and into the bore 28 in the ballast member 24, is an air tube 38 whose upper most end 40 is adapted to be connected to a source of air, such as a regenerative blower (not shown). The air tube 38 includes a plurality of aperture patterns drilled through the wall thereof with the apertures being indicated by numeral 42. It is located close to, but above, the level of the waste stream entrance ports 32 formed in the wall of housing 12. Preferably, three such patterns are formed around the circumference of the air tube each being aligned above one of the wastewater entrance ports 32.

In use, the Aerator/Digester 10 is placed in a wastewater system, for example in a pump lift station, such that the weighted bottom of the device 10 rests on a horizontal surface. The upper end 40 of the air tube 38 is then connected to a source of pressurized air. The air flows down the air tube 38 and exits the apertures in the pattern of apertures 42, with air exiting the apertures creating smaller and larger bubbles. The smaller bubbles float upward and mix with the wastewater to aerate the wastewater while the larger diameter bubbles are initially directed downward toward the inlet ports 32 before they reverse direction and flow upward in the chamber 44 defined by the interior of the housing 12. The movement of the larger bubbles proximate the inlet ports 32 and upward therefrom at a high velocity creates a Venturi effect to circulate the wastewater into the chamber 44 through the wastewater entrance ports 32. As the bubbles rise in the chamber 44, organic particulate matter that may be present in the wastewater (e.g., grease and fats) are driven at a high velocity against the impingement member 34 whose sharp corner edges function to pulverize the clumps before exiting the U-shape discharge openings 30. By increasing the oxygen content of the wastewater and by pulverizing organic matter, aerobic bacteria in the water are better able to thrive and process the increasingly smaller organic substances, thereby improving the quality of the water in which the device 10 is used. Moreover, the high velocity jet of air clears grease fouling.

SUMMARY

While the device disclosed in the '900 patent and embodied in the TITUS TWISTER mixing aerator create effective mixing, mechanical breakdown of solids, and the proper aerobic conditions for wastewater pre-treatment, the mixing aerator itself may be subject to blockage by grease due to the construction of the air tube 38, the apertures of which can become blocked with grease during extended use. The present disclosure features mixing aerators that are of similar construction to those of the '900 patent, but which include improved air delivery assemblies (diffusers) that are resistant to such blocking and can be easily maintained. The diffusers disclosed herein also produce smaller bubbles, which provides better oxygen transfer and move more water for better mixing.

In one aspect, the disclosure features a mixing aerator that includes a housing defining a chamber having a bottom end and a top end, the housing having at least one inlet and at least one outlet; and a longitudinally extending diffuser disposed within the chamber and configured to deliver air bubbles into the chamber when the chamber is filled with liquid, the diffuser comprising (a) a tubular elastomeric membrane having a plurality of perforations and, within the tubular elastomeric membrane, (b) an air pipe having a plurality of openings, the openings being larger and fewer than the perforations, and the tubular membrane having upper and lower ends that are sealed against an outer surface of the air pipe.

The disclosure also features a diffuser for a mixing aerator comprising: a tubular elastomeric membrane having a plurality of perforations and, within the tubular elastomeric membrane, an air pipe having a plurality of openings, the openings being larger and fewer than the perforations, and the tubular membrane having upper and lower ends that are sealed against an outer surface of the air pipe.

Some implementations include one or more of the following features. A gap is provided between an inner surface of the membrane and an outer surface of the air pipe to allow air to flow therebetween. The size of the gap is from about 0.1 to 0.2 inch. The perforations are self-closing. The perforations are in the form of slits. The membrane includes a central region having a first wall thickness and end portions having a second wall thickness greater than the first wall thickness, and the difference in wall thickness is configured to provide the gap. The first wall thickness is from about 0.03 to 0.08 inch. The membrane is formed of an elastomer having a durometer of from about 25 A to 50 A. The membrane is formed of an elastomer that is ozone resistant. The openings in the air tube comprise elongated slots.

The disclosure also features methods of using the mixing aerators described herein to break down greases, fats, and oils and/or provide non-chemical odor control via delivery of gaseous ozone. Methods of the invention include delivering a gas, e.g., air or gaseous ozone, from a source of the gas through the air tube, the gas exiting the perforations in the diffuser membrane in the form of a stream of bubbles.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWINGS

FIG. 6 is an enlarged view of one of the clamps used in the implementation shown in FIG. 2.

DETAILED DESCRIPTION

Figure 1:
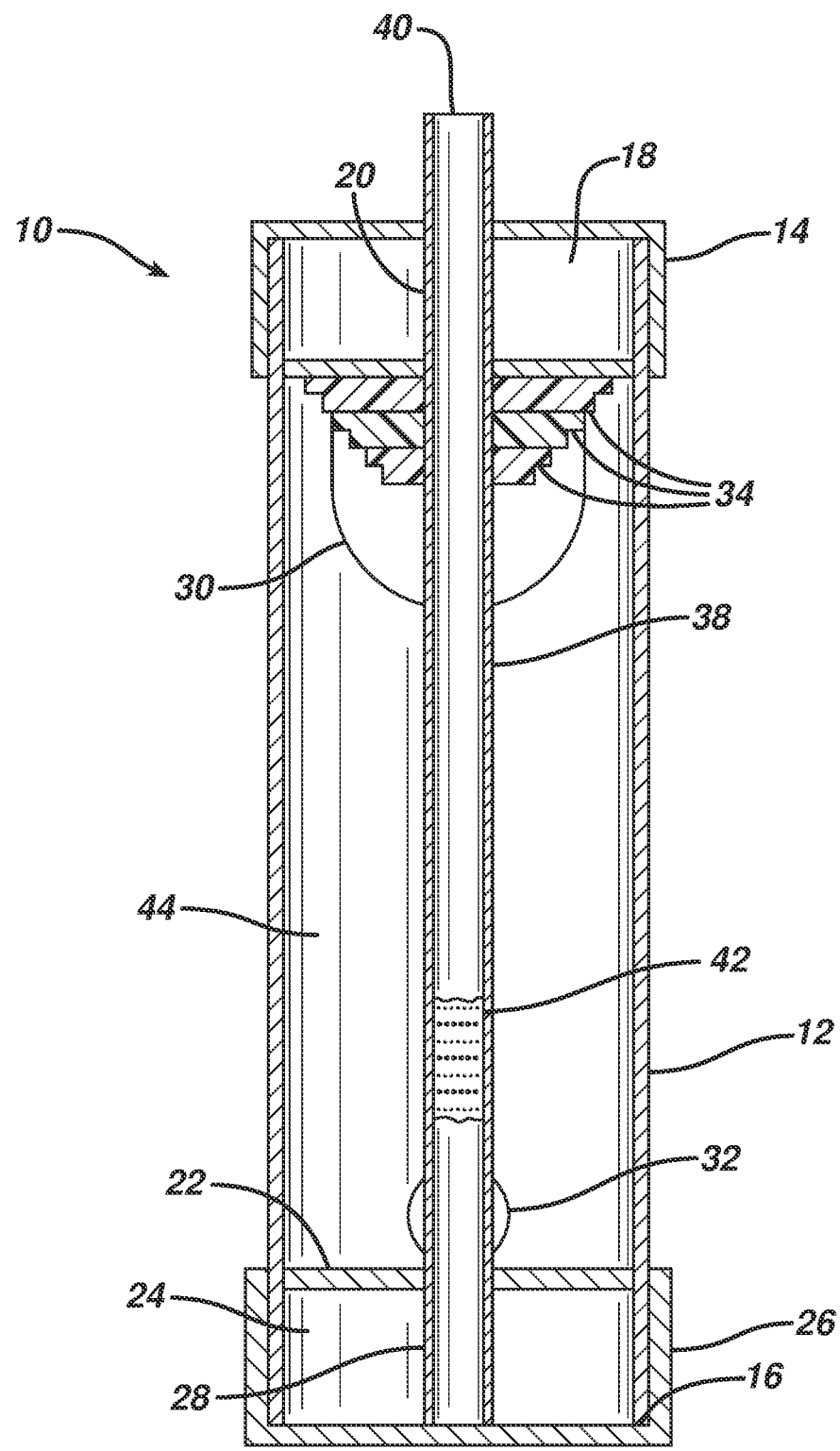
FIG. 1 is a cross-sectional view of a prior art aerator/digester.
Figure 2:
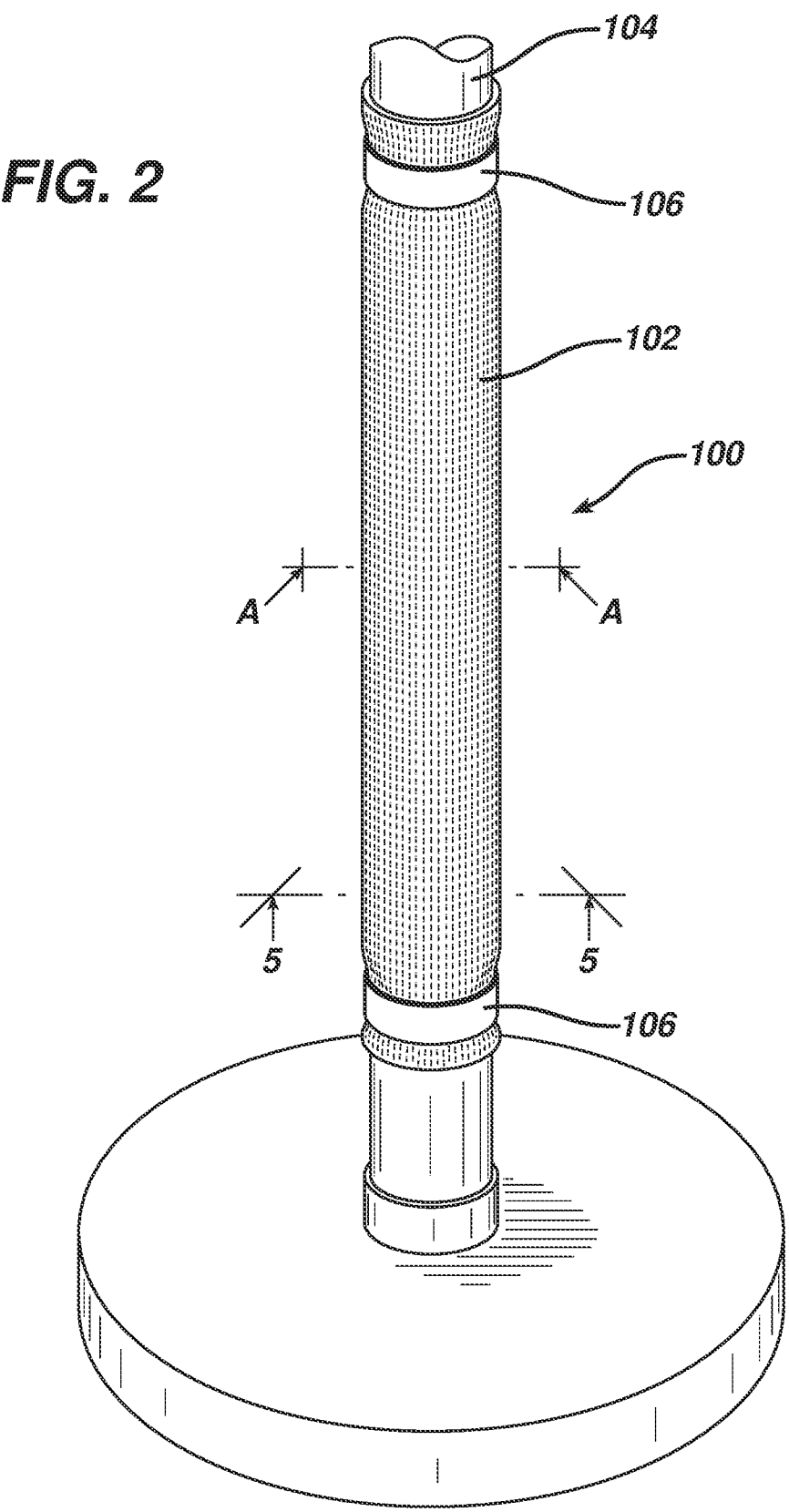
FIG. 2 is a perspective view of a diffuser according to one implementation.
Figure 5:
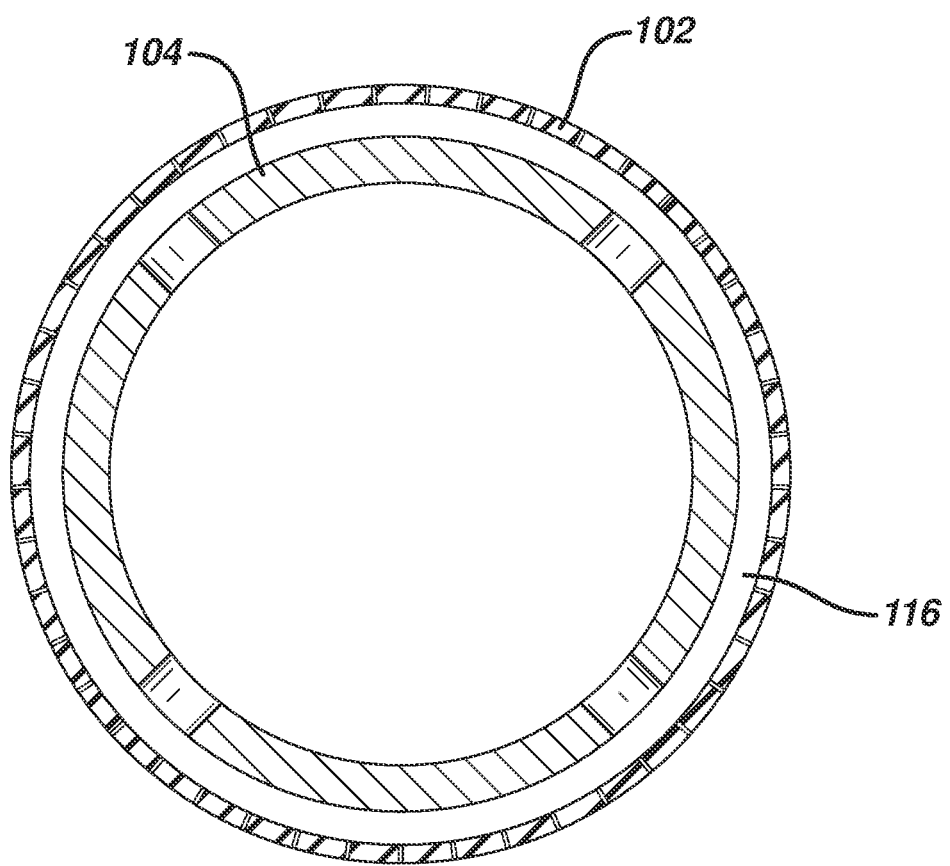
FIG. 5 is a cross-sectional view of the diffuser shown in FIG. 2.

FIGS. 2 and 5 show a diffuser 100 suitable for use in a mixing aerator such as the one shown in FIG. 1. In the case of the system shown in FIG. 1, the diffuser 100 would replace the air tube 38. The diffuser 100 can be used in other types of mixing aerators that include an air delivery tube having apertures and would replace the air delivery tube in such systems. The diffuser 100 may also be used in mixing aerators for delivery of gaseous ozone, e.g., for chemical-free odor control. It is noted that the term "air" is used herein for the sake of simplicity to refer to the gas being delivered by the diffuser; "air" can be replaced with "gaseous ozone" in the description below, which would be delivered through the diffuser in the same manner as air.

Figure 4:
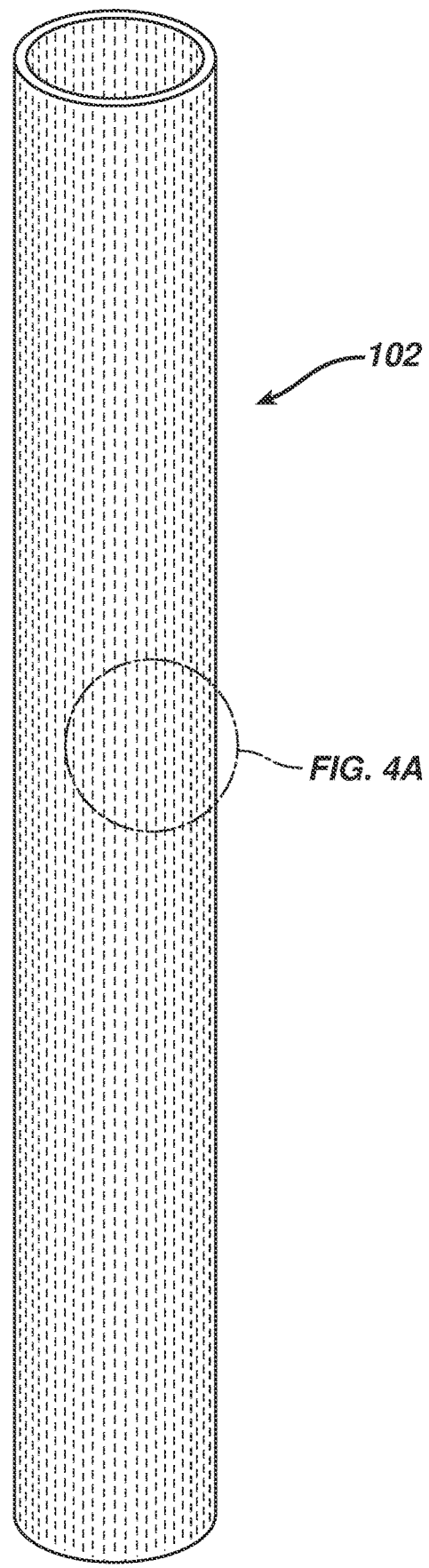
FIG. 4 is a perspective view of the membrane used in the diffuser shown in FIG. 2.
Figure 4A:
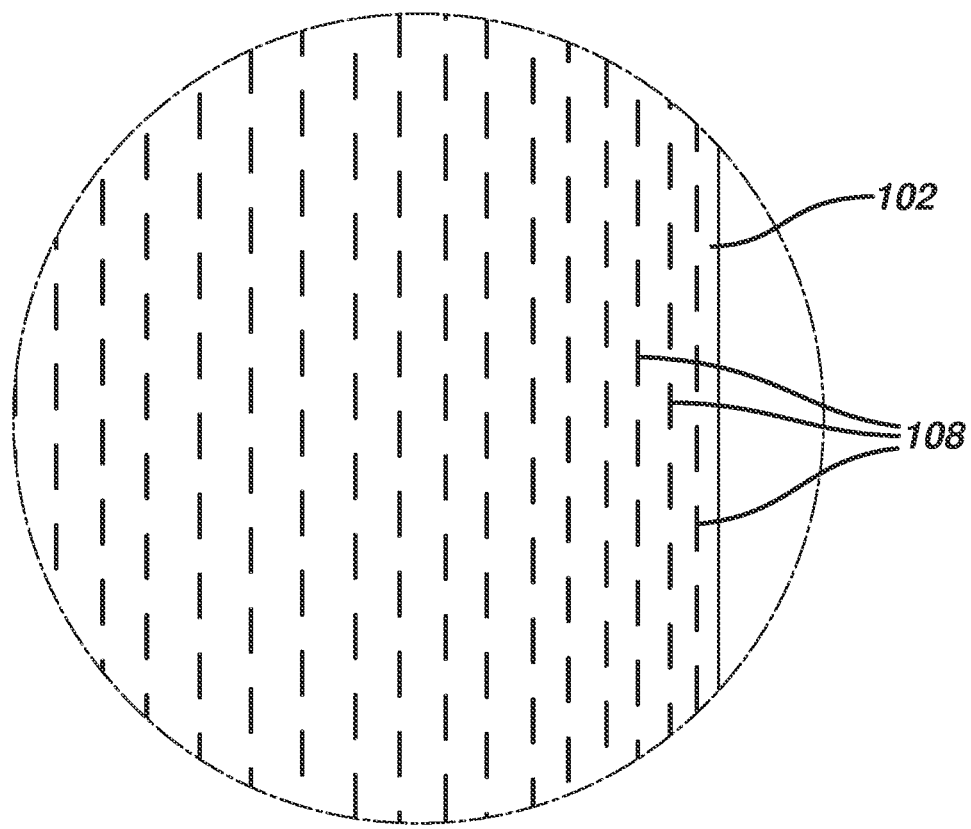
FIG. 4A is a highly enlarged detail view of region A in FIG. 4, showing the perforations in the membrane.

Diffuser 100 includes an elongated tubular membrane 102 and an air tube 104. The membrane 102 is formed of an elastomeric material. The membrane 102 is secured to the air tube in a sealing manner by clamps 106 as will be discussed further below. The membrane 102 includes a plurality of perforations in the form of slits 108 (FIG. 4A) which preferably cover substantially the entire surface of the membrane, as shown in FIGS. 2 and 4, and extend generally parallel to the long axis of the air tube as shown in detail in FIGS. 4 and 4A. It is noted that in the actual diffuser the slits when closed are not readily visible; they are shown diagrammatically in FIGS. 2, 4 and 4A for the sake of explanation.)

Because the membrane is formed of elastomeric material the slits will be normally closed and will only open in response to air pressure. As a result, the slits are self-closing and act as check valves, making both the membrane and the diffuser as a whole resistant to fouling by grease and other contaminants. The structure and characteristics of the membrane 102 will be discussed in further detail below.

Figure 3:
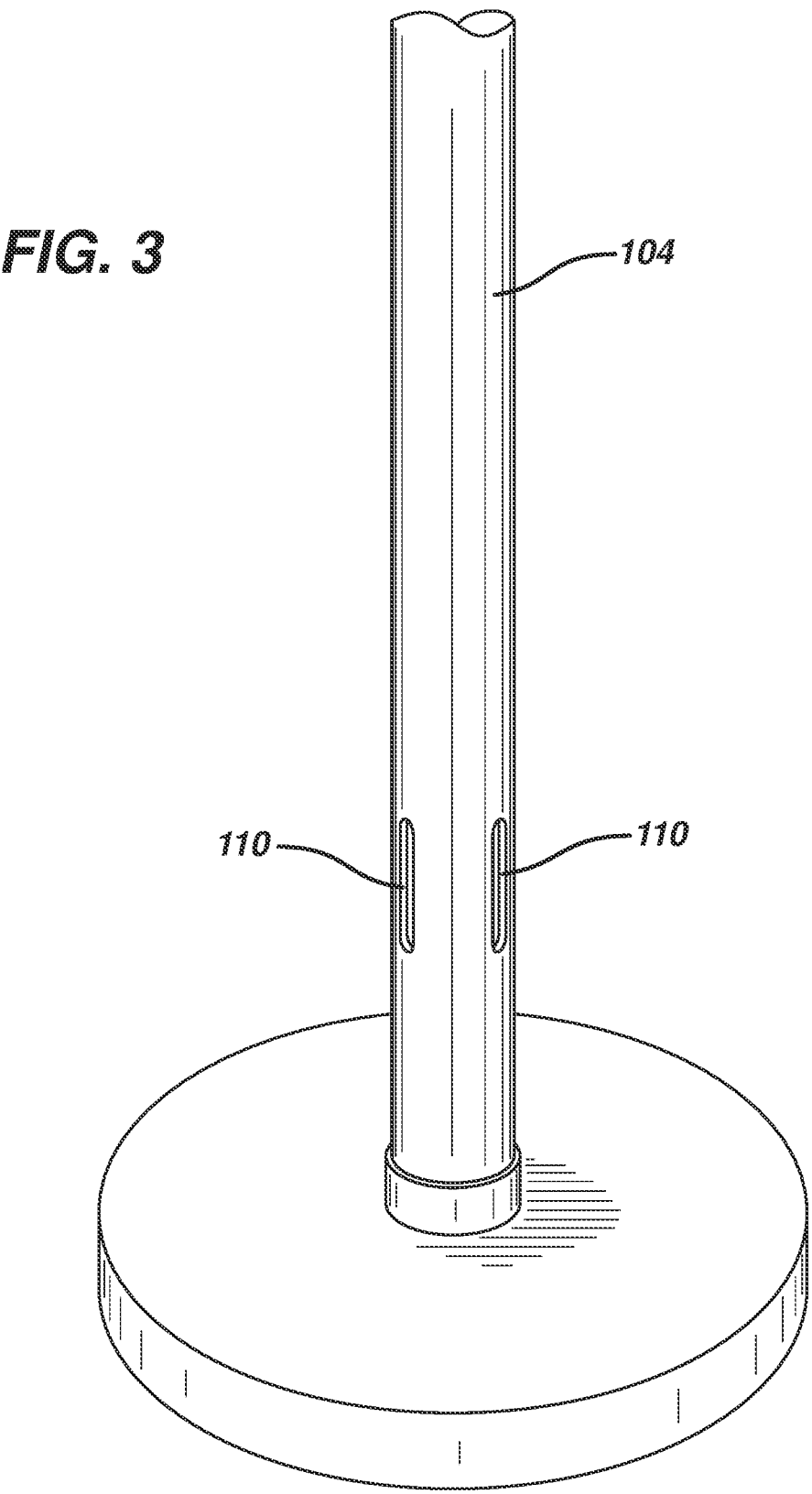
FIG. 3 is a perspective view of the air tube used in the diffuser shown in FIG. 2.

The air tube 104 is disposed within the tubular membrane 102, as shown in FIG. 5. Air tube 104, shown without the membrane 102 in FIG. 3, includes a plurality of elongated slots 110 that extend generally parallel to the long axis of the air tube and are spaced at intervals around its circumference. Preferably the slots are uniformly distributed around the circumference. The slots may be any size as long as the area of the slots is sufficient to allow air to flow out of the air tube at a desired volumetric flow rate with the available air delivery equipment. The appropriate flow rate can be determined empirically by operating the mixing aerator in the intended environment and observing whether adequate breakdown of grease, oil, fats, or other contaminants is obtained. In some implementations the slots are at least 1.5 inches long, but this dimension will depend on the size of the mixing aerator as it will be scalable based on the length and diameter of the air tube. The slots simply need to be big enough to allow sufficient airflow to pressurize the gap 116 (discussed below) between the air tube and the membrane. There is no maximum size for the slots, as long as the structural integrity of the air tube is not compromised.

Figure 2A:
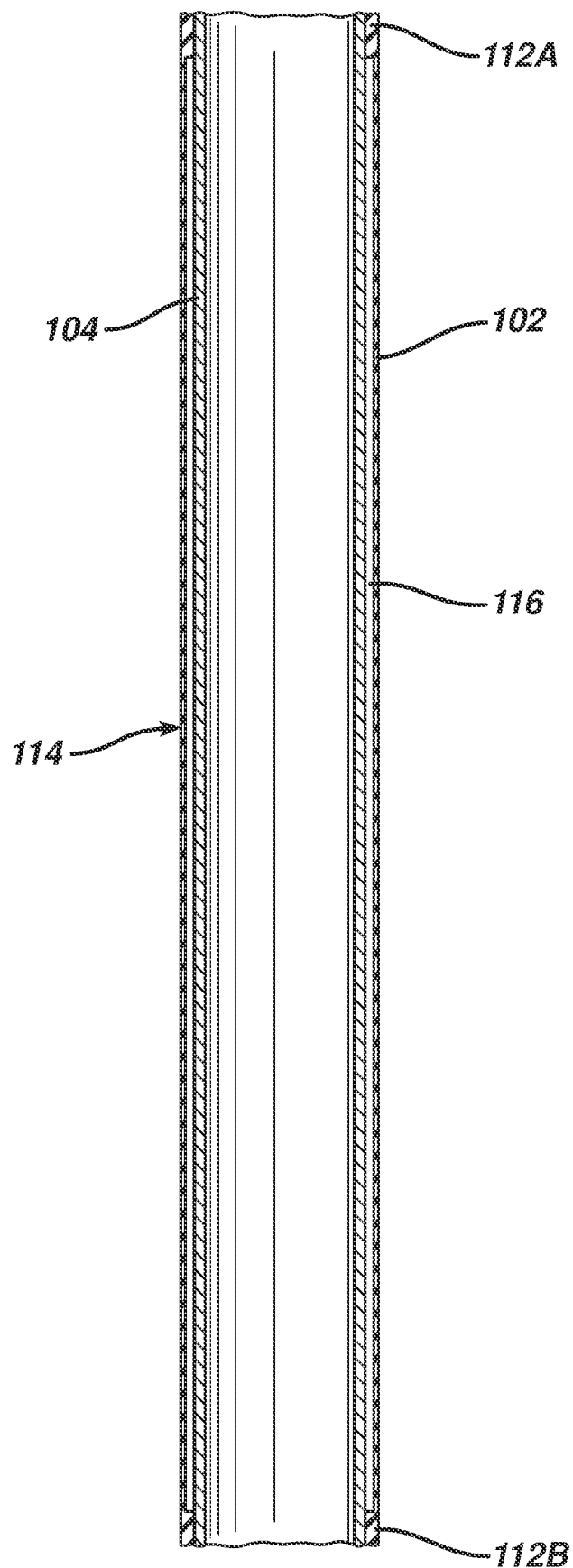
FIG. 2A is a longitudinal cross-sectional view of the diffuser taken along line A-A in FIG. 2.

As can be seen in FIG. 2A, the membrane 102 has a greater wall thickness at its two ends (portions 112A, 112B) than along the remainder of its length (central region 114). For example, in some implementations the portions 112A, 112B may be about 3 to 6 times as thick as the central portion 114 of the membrane. The additional thickness of portions 112A, 112B faces inward, thus providing a gap 116 between the inner surface of the central region 114 and the outer surface of the air tube 104 that extends around the circumference and along the length of the air tube 104. (The size of this gap, which may be, for example, from about 0.1 to 0.2 inches, is not shown to scale in FIG. 2A but rather is exaggerated so that it can be seen.) It is noted that a portion of each of the end portions 112A, 112B is inboard of the clamps 108; otherwise, the gap would not be provided because the clamps 108 would press central portion 114 against the outer surface of the air pipe.

During use, air flows from the slots 110 into the gap 116 creating air pressure that causes the membrane to expand and balloon outwardly. If the gap is too small, the membrane may not expand sufficiently in response to air pressure. This expansion of the membrane 102 causes the slits 108 to expand and open, emitting a flow of small air bubbles into the oxygen transfer chamber that surrounds the diffuser 100 (chamber 44 defined by tubular housing 12 in FIG. 1). The slits act like check valves, closing behind each bubble and thus preventing debris from back-flowing into the diffuser through the membrane.

The membrane 102 may be formed, for example, of a thermoplastic elastomer such as EPDM (ethylene propylene diene monomer). Other suitable materials include other synthetic rubbers such as fluoroelastomer polymers including those sold under the tradename VITON™, chlorosulfonated polyethylenes such as those sold under the tradename HYPALON™, or silicone rubbers. The material should be resistant to the chemicals to which it will be exposed, for example if the diffuser will be used for ozone delivery the material should be ozone resistant. The material used for the membrane should have sufficient flexibility to allow the slits to open enough to release a bubble under the air pressure that will be present in the gap 116, and close after releasing the bubble. It is also important that the membrane be soft and flexible enough so that the membrane does not create excessive back pressure. In some implementations the material has a durometer of from about 25 A to 50 A, for example from about 30 A to 40 A.

The central region 114 of the membrane may have a thickness, in some implementations, of from about 0.03 to 0.08 inch, e.g., 0.035 to 0.065 inch. Generally, the thickness should be sufficient to provide the membrane 102 with sufficient durability and resistance to tearing, while being thin enough to provide the necessary degree of flexibility to allow the slits to open under the supplied air pressure without creating back pressure.

The slits 108 may be formed, for example, by running a tube of membrane material through a perforating machine. In some implementations, the slits have a length of from about 0.06 to 0.3 inch, preferably from about 0.15 to 0.25 inch. The membrane may have, for example, from 15 to 30 slits per square inch.

Referring now to FIG. 6, it is preferred that the clamps 108 be band clamps, and that the free end (not shown) of the band 120 be cut off and the lock 122 be crimped. This configuration prevents the clamps from catching rags and other debris that could foul the diffuser.

Other Embodiments

A number of embodiments have been described. Nevertheless, it will be understood that various modifications may be made without departing from the spirit and scope of the disclosure.

For example, the dimensions given above are merely by way of example and can be scaled or changed to suit various applications.

Moreover, while the implementation above utilizes elongated slots in the air tube for simplicity of manufacture of the air tube, other types of openings may be used, for example round holes.

Accordingly, other embodiments are within the scope of the following claims.

What is claimed is:

1. A mixing aerator comprising:
a housing defining a chamber having a bottom end and a top end, the housing having at least one inlet and at least one outlet; and
a longitudinally extending diffuser disposed within the chamber and configured to deliver air bubbles into the chamber when the chamber is filled with liquid, the diffuser comprising (a) a tubular elastomeric membrane having a plurality of perforations and, within the tubular elastomeric membrane, (b) an air pipe having a plurality of openings, the openings being larger and fewer than the perforations, and the tubular membrane having upper and lower ends that are sealed against an outer surface of the air pipe, wherein a gap is provided between an inner surface of the membrane and an outer surface of the air pipe to allow air to flow therebetween and wherein the membrane includes a central region having a first wall thickness and end portions having a second wall thickness greater than the first wall thickness, and the difference in wall thickness is configured to provide the gap that extends around the circumference and along the length of the air pipe.

2. The mixing aerator of claim 1 wherein the size of the gap is from about 0.1 to 0.2 inch.

3. The mixing aerator of claim 1 wherein the perforations are self-closing.

4. The mixing aerator of claim 2 wherein the perforations are in the form of slits.

5. The mixing aerator of claim 1 wherein the first wall thickness is from about 0.03 to 0.08 inch.

6. The mixing aerator of claim 1 wherein the membrane is formed of an elastomer having a durometer of from about 25 A to 50 A.

7. The mixing aerator of claim 1 wherein the membrane is formed of an elastomer that is ozone resistant.

8. The mixing aerator of claim 1 wherein the openings in the air pipe comprise elongated slots.

9. A diffuser for a mixing aerator comprising:
a tubular elastomeric membrane having a plurality of perforations and,
within the tubular elastomeric membrane, an air pipe having a plurality of openings, the openings being larger and fewer than the perforations, and the tubular membrane having upper and lower ends that are sealed against an outer surface of the air pipe, wherein a gap is provided between an inner surface of the membrane and an outer surface of the air pipe to allow air to flow therebetween and wherein the membrane includes a central region having a first wall thickness and end portions having a second wall thickness greater than the first wall thickness, and the difference in wall thickness is configured to provide the gap that extends around the circumference and along the length of the air pipe.

10. The diffuser of claim 9, wherein the size of the gap is from about 0.1 to 0.2 inch.

11. The diffuser of claim 9 wherein the perforations are self-closing.

12. The diffuser of claim 10 wherein the perforations are in the form of slits.

13. The diffuser of claim 9 wherein the first wall thickness is from about 0.03 to 0.08 inch.

14. The diffuser of claim 9 wherein the membrane is formed of an elastomer having a durometer of from about 25 A to 50 A.

15. The diffuser of claim 9 wherein the membrane is formed of an elastomer that is ozone resistant.

16. The diffuser of claim 9 wherein the openings in the air pipe comprise elongated slots.

* * * * *